Feb. 13, 1951 L. BALDINI ET AL 2,541,188
DISPENSER ATTACHABLE TO NECK OF LIQUID CONTAINER, HAVING
A VALVE AND A REGISTER WITH A COMMON ACTUATOR
Filed Aug. 6, 1946 2 Sheets-Sheet 1
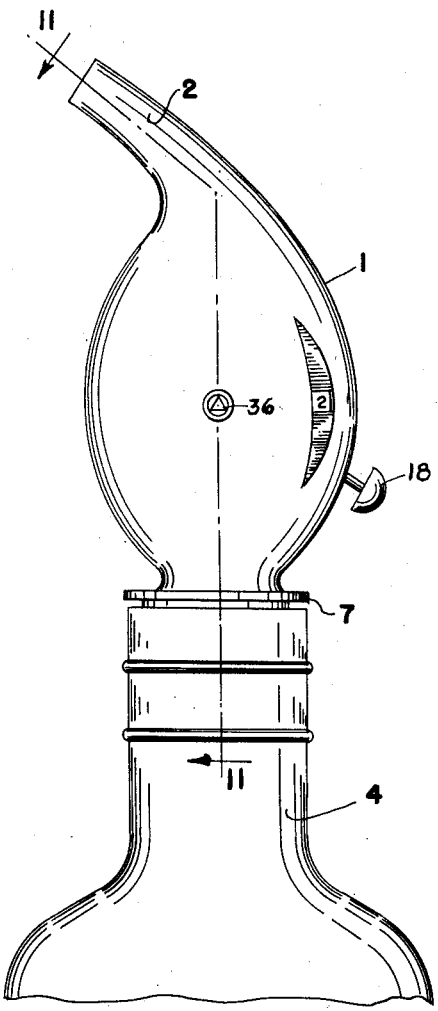
FIG. 1
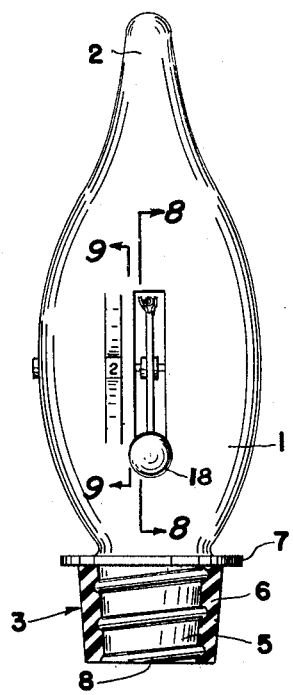
FIG. 2
FIG. 3
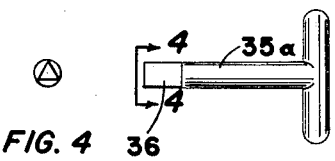
FIG. 4
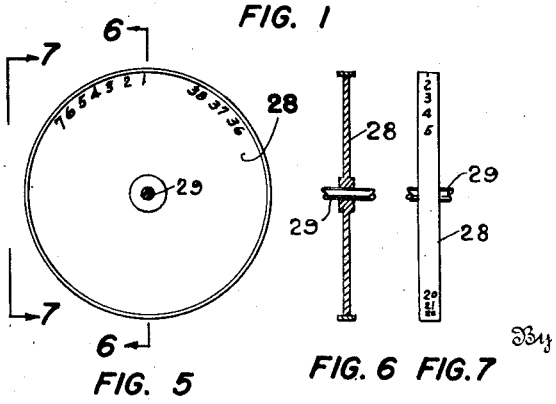
FIG. 5  FIG. 6  FIG. 7
Inventors
JOSEPH ROSSI
LOUIS BALDINI Feb. 13, 1951     L. BALDINI ET AL     2,541,188
DISPENSER ATTACHABLE TO NECK OF LIQUID CONTAINER, HAVING
A VALVE AND A REGISTER WITH A COMMON ACTUATOR
Filed Aug. 6, 1946     2 Sheets-Sheet 2

Inventors
JOSEPH ROSSI
LOUIS BALDINI

By
Attorney

Patented Feb. 13, 1951

2,541,188

UNITED STATES PATENT OFFICE 2,541,188

DISPENSER ATTACHABLE TO NECK OF LIQUID CONTAINER, HAVING A VALVE AND A REGISTER WITH A COMMON ACTUATOR

Louis Baldini and Joseph Rossi, Scranton, Pa.

Application August 6, 1946, Serial No. 688,790

2 Claims. (Cl. 222—38)

Our invention relates to a liquid dispensing device and more particularly to a liquid measuring and counting dispenser for dispensing liquids from bottles.

The dispensing device of the present invention comprises essentially a housing formed with a pouring nozzle, and a base adapted for insertion into the mouth of a bottle. The interior body portion of the housing is formed with a measuring compartment designed to contain a measured quantity of liquid, the outer walls of the compartment having ports therein, one of the ports leading to the interior of the bottle and the other to the pouring nozzle. Valve means, slidably mounted in the inner walls of the compartment, are provided whereby one of the ports is closed when the other port is opened. A suitable operating lever or trigger, pivotally mounted upon the housing, is connected to the valve device by means of a toggle connection. A registering mechanism, mounted in the housing, is constructed and arranged whereby one unit of measured liquid is registered each time the trigger is moved to dispensing position.

An object of our invention is to provide an improved liquid measuring and counting dispenser.

Another object of our invention is to provide an improved liquid dispenser adapted for dispensing liquids from bottles.

Yet another object of our invention is to provide an improved liquid dispensing device having means formed thereon adapted for insertion into the mouth of a bottle, said means being constructed and arranged to provide a liquid-tight seal.

A further object of our invention is to provide an improved liquid dispensing arrangement whereby measured quantities of liquid may be dispensed from a bottle.

A still further object of our invention is to provide a liquid dispensing device consisting of but few parts, strong and sturdy in construction, and one that is not liable to get out of order even after long and continued use.

With these and other objects in view, which may be incident to our improvements, the invention consists in the parts and combinations to be hereinafter set forth and claimed, with the understanding that the several necessary elements, comprising our invention, may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings:

Figure 1 is a side elevational view, showing our improved dispensing device, operatively associated with a bottle.

Fig. 2 is a rear elevational view, partly in section, of the dispenser shown in Fig. 1.

Fig. 3 is a detailed view of the key used to set the registering mechanism.

Fig. 4 is a sectional view along line 4—4 of Fig. 3.

Fig. 5 is a side elevational view of the dial of the register device.

Fig. 6 is a sectional view along line 6—6 of Fig. 5.

Fig. 7 is a sectional view along line 7—7 of Fig. 5.

Figure 8:
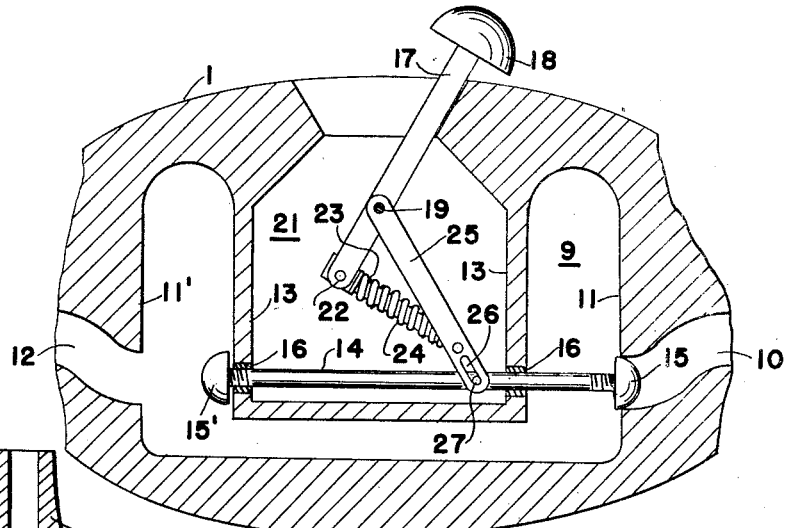
Fig. 8 is a sectional view along line 8—8 of Fig. 2.
Figure 11:
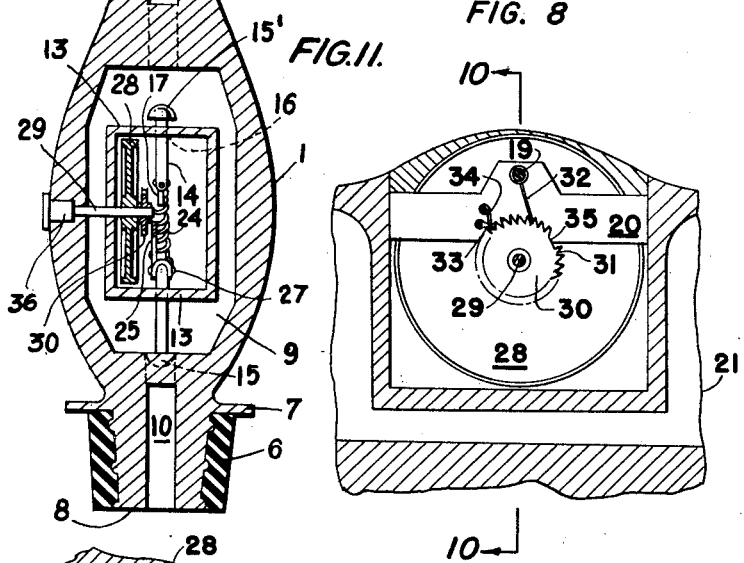
Fig. 11 is a sectional view along line 11—11 of Fig. 1.

Referring to the drawings, and more particularly to Figs. 1 and 2, the dispensing device comprises a housing 1, having a pouring nozzle 2, and a base, designated generally by numeral 3, adapted for insertion into the mouth of a bottle 4. The base 3 of the dispenser comprises a threaded extension 5, formed integral with the housing, and having a resilient sleeve 6, positioned thereon. It will be noted that extension 5 is slightly tapered below the peripheral flange 7, in the direction of its open end 8. The resilient sleeve 6, which may be formed from rubber or the like, is tapered complementary to the taper of extension 5, the opening in the sleeve being designed to provide a snug fit with the extension when the sleeve is positioned thereon.

When it is desired to attach the dispensing device to a bottle, sleeve 6 is first inserted into the mouth of the bottle and thereafterwards extension 5, is turned down into the sleeve. Due to the tapered threaded arrangement of the extension, the body portion of the sleeve is forced outwardly into liquid-tight engagement with the interior surface of the neck of the bottle. It will be understood that in lieu of first inserting the sleeve into the mouth of the bottle, that the sleeve may be initially applied to the extension, that is to say, it may be partially applied thereto, and when the extension is simultaneously rotated and forced downwardly into the neck of the bottle, the sleeve will be expanded and form a liquid-tight seal.

It will be appreciated that considerable variation exists in sizes of the openings formed in the mouths of different type bottles. By reason of our improved arrangement of the tapered, threaded extension, in combination with the rubber sleeve, a wide latitude in bottle mouth size is permitted, however, the effectiveness of the seal is still maintained.

Referring to Fig. 8, the body portion of housing 1, interiorly thereof, is formed with a measuring compartment 9, designed to hold or contain a predetermined volume of liquid. An inlet port 10, formed in the outer wall 11 of the compartment, leads to the interior of the bottle and an outlet port 12 formed in the opposite outer wall 11', leads to the pouring nozzle. Slidably mounted in the inner wall portions 13 of the measuring chamber is a valve mechanism comprising a rod or plunger 14 having resilient stops 15, 15' attached thereto. The stops may be formed from rubber or the like, or other suitable material, the spherical shaped head portions thereof being adapted to seat in and close inlet port 10 or outlet port 12 respectively. Suitable bushings 16 form bearings for the rod and prevent leakage of liquid from within the measuring chamber to the exterior of the dispenser housing.

Figure 9:
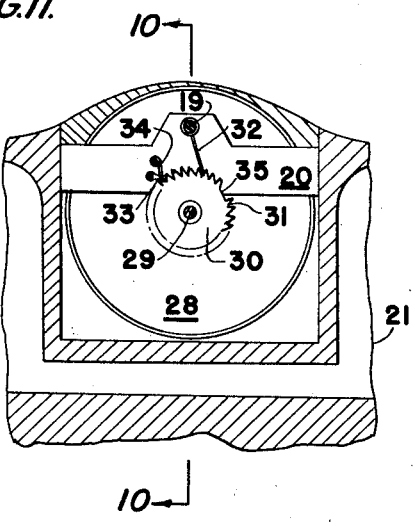
Fig. 9 is a sectional view along line 9—9 of Fig. 2.

The valve operating mechanism, whereby ports 10 and 12 may be opened or closed, comprises a lever or trigger 17, having a head portion 18, exterior of the dispenser casing. The trigger 17 is pivotally connected to the dispenser housing by means of pin 19, one end of which seats in the body portion of the housing, the other end of the pin being supported in a cross-member 20, (Fig. 9) extending transversely of the interior recessed portion 21 of the housing. The end of the trigger within the housing is pivotally attached, as at 22, to an arm 23, having a spring 24 mounted exteriorly thereof, the opposite end of arm 23 being mounted for pivotal movement with respect to a link member 25, connected between pin 19 and the valve plunger 14. The link 25 is formed with a longitudinal slot 26, adapted to receive a pin 27, attached to the valve plunger. It will be noted that the above described valve operating mechanism is in the form of a toggle connection between the trigger and the valve rod.

As will be seen in Fig. 8, the parts are in the position which they assume when liquid is to be dispensed. When it is desired to fill the measuring chamber with liquid, trigger 17 is moved to the left of the position shown, causing valve rod 14, through the medium of the toggle connection, to slide to the left, thereby opening inlet port 10 and closing outlet port 12. Due to the snap-action of the toggle connection, rapid opening and closing of the respective valves is obtained. The arrangement of the toggle is such that it precludes manipulation of the trigger by the operator, so as to hold the valve rod in an intermediate position, with both ports open. As indicated above, opening and closing of the ports occurs substantially simultaneously, and the linkage is constructed and arranged to move the valve plunger in desired direction with minimum time lag between the opening of one port and the closing of the other.

Figure 10:
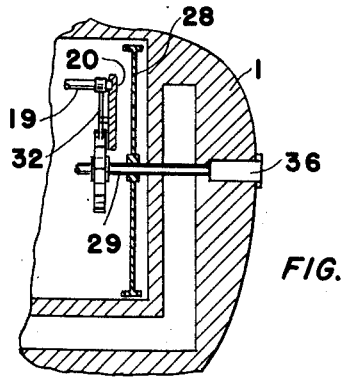
Fig. 10 is a sectional view along line 10—10 of Fig. 9.

Operatively connected with the valve operating mechanism is a registering device adapted to register each unit of liquid dispensed. The register comprises dial 28 attached to a suitable shaft 29 (Figs. 9 and 10) having numbered graduations on one side face and on the peripheral surface thereof, as shown in Figs. 5 and 7. In order that the unit members of dispensed liquid may be viewed by the operator from the side or from the rear of the dispenser the housing 1 is formed with windows 1'. Inwardly of the dial and keyed to shaft 29 is a ratchet wheel 30 having a plurality of teeth 31, the spacing between teeth being such that when wheel 30 is rotated a distance of one tooth, by pawl member 32, the dial is rotated to indicate that one unit of liquid has been dispensed.

In order to prevent counter rotation of wheel 30, a dog 33, held in seated position between the teeth 31, by spring 34, is provided. It will be noted that the teeth of wheel 30 are not continuous, that is, a gap or space 35a is left in the tooth periphery. The purpose of this arrangement is to prevent further rotation of wheel 30 and dial 28, after the contents of the bottle has been dispensed. The register may be re-set by means of a key 35a (Fig. 3) adapted for insertion into a fitting 36, operatively connected with shaft 29.

The dispenser of the present invention while of general application in connection with the dispensing of liquids from bottles, is particularly adapted for dispensing alcoholic beverages. such as wine, whiskey and the like, from bottles. When so used, the customer is assured of receiving the exact quantity of liquor purchased. The predetermined quantity of liquor may be easily and quickly poured from a bottle without danger of spilling. By means of the register or counter associated with the dispenser, the total number of units of liquor dispensed from a given bottle can be readily ascertained when it is desired to take inventory.

The dispenser housing may be conveniently formed from plastic or like materials. The housing is preferably molded in two parts and after the valve mechanism, together with the counter etc. have been placed in operative position in one part of the housing, the other complementary part of the housing is placed thereon and sealed to form a closed container.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

What we claim is:

1. A device for dispensing liquids from bottles, comprising a housing, including a body portion, said housing having means formed thereon adapted for insertion into the mouth of a bottle, a measuring chamber, including inner and outer wall portions, formed integral with the body portion interiorly thereof, said chamber having an inlet port in one of its outer wall portions and an outlet port in the opposite outer wall portion, valve means associated with said chamber adapted to close one of said ports and open the other port, comprising a plunger slidably mounted in the inner wall portions of the chamber, valve operating means comprising a trigger member pivotally mounted upon the housing and connected to the slidable valve by means of a toggle connection, and a registering mechanism operatively connected with the toggle, whereby said mechanism is positively actuated when the trigger is moved to dispensing position.

2. A device for dispensing liquids from bottles, comprising a housing, including a body portion, said housing having means formed thereon adapted for insertion into the mouth of a bottle, a measuring chamber, including inner and outer wall portions formed integral with the body portion interiorly thereof, said chamber having an inlet port in one of its outer wall portions and an outlet port in the opposite outer wall portion, valve means associated with said chamber adapted to close one of said ports and open the other port, comprising a plunger slidably mounted in the inner wall portions of the chamber, the free ends of the plunger having resilient head members attached thereto, one of said members being adapted to seat in the inlet port and the other of said members being adapted to seat in the outlet port, valve operating means comprising a trigger member pivotally mounted upon the housing and connected to the slidable valve by means of a toggle connection, and a registering mechanism operatively connected with the toggle, whereby said mechanism is positively actuated when the trigger is moved to dispensing position.

LOUIS BALDINI.
JOSEPH ROSSI.

REFERENCES CITED

The following references are of record in the file of this patent:

UNITED STATES PATENTS

| Number | Name | Date |
|---|---|---|
| 421,667 | Carter | Feb. 18, 1890 |
| 1,256,298 | Cremona | Feb. 12, 1918 |
| 2,044,945 | Humbard | June 23, 1936 |
| 2,129,895 | Weiter | Sept. 13, 1938 |

FOREIGN PATENTS

| Number | Country | Date |
|---|---|---|
| 27,403 | Denmark | Mar. 23, 1921 |
| 31,128 | Switzerland | July 28, 1904 |